United States Patent [19]

Enjo et al.

[11] Patent Number: 4,562,995
[45] Date of Patent: Jan. 7, 1986

[54] WORKING FLUIDS FOR RANKINE CYCLE

[75] Inventors: Naonori Enjo, Suita; Hideki Aomi; Masahiro Noguchi, both of Osaka; Satoshi Ide, Settsu, all of Japan

[73] Assignee: Daikin Kogyo Co., Ltd., Osaka, Japan

[21] Appl. No.: 479,178

[22] Filed: Mar. 28, 1983

[30] Foreign Application Priority Data

Mar. 31, 1982 [JP] Japan .................................. 57-54642
Mar. 31, 1982 [JP] Japan .................................. 57-54645

[51] Int. Cl.⁴ ............................................. F01K 25/08
[52] U.S. Cl. ..................................... 252/67; 60/641.7; 60/650; 60/651; 60/671; 252/69
[58] Field of Search ................... 252/67, 69; 60/641.7, 60/650, 651, 671

[56] References Cited

U.S. PATENT DOCUMENTS 4,109,469  8/1978  Carson .................................. 60/651
4,303,536 12/1981  Orfeo et al. ............................ 252/67

OTHER PUBLICATIONS

Holldorff, "Refrigeration by Waste Heat: Absorption Refrigeration or Rankine Cycle?", Ki, Klima, Kaelte, Heiz. 1983, 11(2), 65–70, (CA 99:7327).

Ikubo, "Organic Fluorine Compounds for Working Fluid", Yuki Gosei Kagaku Kyokaishi 1983, 41(4), 365–8, (CA 99:198006).

Primary Examiner—Paul Lieberman
Assistant Examiner—Robert A. Wax
Attorney, Agent, or Firm—Larson and Taylor

[57] ABSTRACT

Working fluids for the Rankine cycle comprising chlorodifluoromethane and one of difluoroethane and dichlorotetrafluoroethane.

3 Claims, 4 Drawing Figures

WORKING FLUIDS FOR RANKINE CYCLE

This invention relates to novel working fluids for a Rankine cycle.

Heretofore water has been almost exclusively used as working fluids in the Rankine cycle in which thermal energy is converted into mechanical energy by repeating a cycle comprising vaporizing a liquid medium with heating, expanding the vapor in an expansion device to produce mechanical energy, and then compressing by a pump to condense the medium and evaporating the medium. Although long applied as working fluids to steam engines, water has the following drawbacks. It has a limited application due to its high freezing point and great specific volume on vaporization; requires a larger installation and is lower in efficiency when using a low-temperature heating source; and readily freezes and becomes inserviceable at low temperatures.

While various organic working fluids have been proposed to eliminate the drawbacks of water, most of them are found to be unsatisfactorily usable due to their inflammability, corrosivity, and so on.

Particularly, in view of effective use of energy, various heat sources have been investigated for use at different levels of temperatures. LNG is used as as lower-temperature heat source and even industrial waste heats or the heat of the earth is going to be utilized as a high-temperature heat source.

As a working fluid for the low-temperature heat source, chlorodifluoromethane (hereinafter referred to as Flon-22) was studied but found to have low efficiency of conversion of thermal energy to mechanical energy when used for a Rankine cycle. Trichlorofluoromethane (hereinafter to be referred to as Flon-11) is one of those used in practice. However, Flon-11 has the following drawbacks as the working fluids for the Rankine cycle. It produces a low efficiency in conversion of thermal energy into mechanical energy, particularly yielding further reduced efficiency at a higher heating temperature range where it is decomposed to change its thermodynamic properties. When thermally decomposed, Flon-11 produces free chlorine to cause corrosion of apparatus. Because of the above-mentioned drawbacks, Flon-11 is not suited as a working fluid which is usable for any kind of heat sources. Thus, there is an intensive demand on the development of working fluids usable for the Rankine cycle with an improved conversion efficiency and thermal stability.

To meet such demand for satisfactory working fluids, we conducted extensive research and found that a mixture of substances having different properties exhibits superior properties to those of working fluids comprising a single substance which have heretofore been studied and that a mixture of chlorodifluoromethane (hereinafter referred to as Flon-22) and one of difluoroethane (hereinafter referred to as Flon-152) and dichlorotetrafluoroethane (hereinafter referred to as Flon-114) gives markedly excellent properties as a working fluid for the Rankine cycle. Particularly, a mixture of chlorodifluoromethane (Flon-22) and difluoroethane (Flon-152) has been found to exhibit excellent properties when used as a working fluids for a Rankine cycle with use of heat sources having a small temperature difference such as the case of oceanic electric power generation wherein is utilized the temperature difference between sea water of lower temperature in the deeper part of the sea and that of higher temperature in the shallow part of the sea. The present invention has been accomplished based on this novel finding.

It is an object of this invention to provide working fluids for a Rankine cycle which fluids can exceedingly increase the efficiency of conversion of thermal energy to mechanical energy.

It is another object of this invention to provide working fluids for a Rankine cycle which fluids have a markedly high stability at a high-temperature range and can be used with safety.

These objects and other characteristics of this invention will become apparent from the following description.

The foregoing objects can be achieved by using the following mixture as a working fluid in the Rankine cycle:

(i) a mixture of chlorofluoromethane (Flon-22) and difluoroethane (Flon-152)

(ii) a mixture of chlorofluoromethane (Flon-22) and dichlorotetrafluoroethane (Flon-114). The working fluids of this invention can be easily prepared by mixing the above specified components in an appropriate ratio.

While the amounts of the components to be mixed are not particularly limitative, preferably the mixture (i) comprises 60 to 95% by weight of Flon-22 and 5 to 40% by weight of Flon-152, and the mixture (ii) comprises 3 to 40% by weight of Flon-22 and 60 to 97% by weight of Flon-114.

With regard to Flon-152, any one of its isomers, i.e. 1,1-difluoroethane and 1,2-difluoroethane can be used singly or as a mixture thereof.

The working fluids according to the invention have the following advantages over heretofore known working fluids.

First, when used for a Rankine cycle, the present working fluids comprising a mixture of Flon-22 and Flon-152 or Flon-114 produces a high efficiency in conversion of thermal energy to mechanical energy and has markedly superior properties to that produced by a heretofore known working fluid for the Rankine cycle such as Flon-11.

Second, whereas a working fluid for the Rankine cycle is required to have high stability as one of its essential properties, the above-mentioned known working fluid, Flon-11, can not be used for a Rankine cycle where the heat sources have a high temperature since it decomposes at a high temperature. On the contrary, Flon-22, Flon-152 and Flon-114 are stable at a high-temperature range. Mixtures of these compounds similarly have a high thermal stability.

Although an inflammable or explosive working fluid has a limited application, Flon-22 and Flon-114 are not inflammable at ordinary temperatures when mixed with air in any ratio.

Flon-152, which is inflammable per se, can be made less inflammable when mixed with Flon-22 and increases stability with increasing ratio of Flon-22.

The Rankine cycle generally refers to the performance of a steam engine, and to an ideal cycle consisting of two adiabatic changes and two isobaric changes. The term Rankine cycle used throughout the specification and claims includes a practical cycle consisting of two substantially adiabatic changes and two substantially isobaric changes.

This invention will be described below in more detail with reference to the accompanying drawings and to examples and comparison examples.

FIG. 1 is a pressure-enthalpy diagram (P-H diagram) of a mixture according to the invention which comprises 90% by weight of Flon-22 and 10% by weight of Flon-152. The diagram illustrates the relation between pressure and state of phase of the mixture and the enthalpy thereof at a temperature in the range of 0° to 30° C. and also shows equi-specific volume lines and equi-entropy lines. From the diagram, estimation of the Rankine cycle (design of pressure of the apparatus, amount of heat exchange, etc.) can be carried out.

FIG. 2 is a pressure-enthalpy diagram (P-H diagram) of a mixture according to the invention which comprises 90% by weight of Flon-114 and 10% by weight of Flon-22. The diagram illustrates the relation between pressure and state of phase of the mixture and the enthalpy thereof at a temperature in the range of −10° to 110° C. and also shows equi-specific volume lines and equi-entropy lines. The points A, B, C, D and E appearing in FIG. 2 correspond to those in FIGS. 3 and 4 which represent the respective points of state in the Rankine cycle carried out in Example 7 below.

Figure 3:
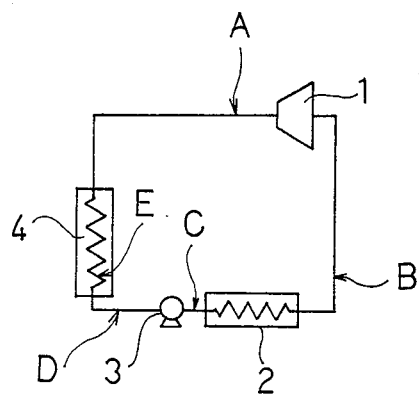
FIG. 3 is a flow sheet of the Rankine cycle carried out for conversion of thermal energy into mechanical energy.
Figure 4:
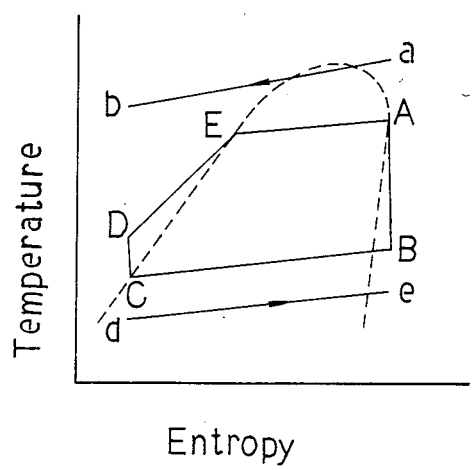
FIG. 4 shows an illustrative temperature-entropy diagram of the Rankine cycle in which a mixture of Flon-22 and Flon-152 or a mixture of Flon-22 and Flon-114 is used as a working fluid. The alphabets (A to E) appearing in FIG. 3 correspond respectively to those in FIG. 4 which represent points of state of the working fluid.

Referring to FIGS. 3 and 4, a working fluid is heated and vaporized in the evaporator 4 to produce vapor of high temperature and high pressure. The change of state is shown by D, E and A in FIG. 4 where the liquid-phase working fluid is heated to a boiling temperature at which the total fluid vaporizes. The vapor is then superheated (as shown by the change from E to A), and enters the expansion device 1 in which the superheated vapor is adiabatically expanded. At the time, the temperature and pressure are lowered and the state of the fluid is changed from A to B as shown in FIG. 4 to conduct the work. The vapor-phase working fluid at lowered temperature and pressure is then sent to the condenser 2 where it is cooled by a low-temperature heat source and liquefied by condensation to get into a liquid phase (as indicated by the change from B to C). Thereafter the fluid is returned to the pump 3 to repeat the cycle. In FIG. 4, the point a represents the state of a heat source, e.g. warm sea water, when it enters the evaporator, b represents the state of the heat source when it leaves the evaporator and the arrow on the line from a to b indicates the direction of flow of the heat source. The point d represents the state of cold sea water at the inlet of condenser, the point e represents the state of the same at the outlet of the condenser and the arrow on the line from d to e indicates the direction of flow of the cold sea water.

Usable as the expansion device for a Rankine cycle system are for example rotating or reciprocating displacement expansion devices and turbine expansion devices. Boilers commonly used to produce steam are useful as the evaporator for the system. Illustrative of useful condensers are those of the type as used in refrigerating apparatus. Employable as the pump are pressure liquid feed pumps for organic solvents generally used in chemical industries.

EXAMPLES 1-5 AND COMPARISON EXAMPLE 1

The Rankine cycle illustrated in FIGS. 3 and 4 was carried out with use of the respective working fluids having compositions given in Table 1 below under the following conditions:
(1) warm sea water
  (i) flow rate—27,000 ton/hr
  (ii) temperature at the inlet of the evaporator—30° C. (point a in FIG. 4)
  (iii) temperature at the outlet of the evaporator—27.5° C. (point b in FIG. 4)
(2) cold sea water
  (i) temperature at the inlet of the condenser—6.3° C. (point d in FIG. 4)
  (ii) temperature at the outlet of the condenser—8.8° C. (point e in FIG. 4)
(3) condensing temperature of the medium—10° C., 11° C. and 12° C.

TABLE 1

| Medium Flon-22/Flon-152 | Comp. Example 100/0 | Example 1 95/5 | Example 2 90/10 | Example 3 80/20 | Example 4 70/30 | Example 5 60/40 |
|---|---|---|---|---|---|---|
| Condensing temperature 10° C. | | | | | | |
| Adiabatic enthalpy drop (AE) (Kcal/kg) | 1.92 | 1.93 | 1.94 | 2.01 | 2.08 | 2.15 |
| Flow rate of working fluid (GF) (ton/hr) | 1550 | 1690 | 1830 | 2010 | 2060 | 2020 |
| Gross power output (POW) (KW) | 3280 | 3580 | 3910 | 4450 | 4740 | 4800 |
| Pump power for working fluid (PIA) (KW) | 170 | 180 | 180 | 190 | 190 | 180 |
| Pump power for cold & warm water (PIB) (KW) | 1030 | 1100 | 1200 | 1330 | 1400 | 1430 |
| Net power output (PWT) (KW) | 2080 | 2300 | 2530 | 2930 | 3150 | 3190 |
| Condensing temperature 11° C. | | | | | | |
| Adiabatic enthalpy drop (AE) (Kcal/kg) | 1.80 | 1.83 | 1.85 | 1.86 | 1.88 | 1.98 |
| Flow rate of working fluid (GF) (ton/hr) | 1550 | 1690 | 1830 | 2010 | 2060 | 2020 |
| Gross power output (POW) (KW) | 3060 | 3370 | 3730 | 4130 | 4380 | 4420 |
| Pump power for working fluid (PIA) | 160 | 170 | 170 | 180 | 180 | 170 |

TABLE 1-continued

| Medium<br>Flon-22/Flon-152 | Comp.<br>Example<br>100/0 | Example | | | | |
|---|---|---|---|---|---|---|
| | | 1<br>95/5 | 2<br>90/10 | 3<br>80/20 | 4<br>70/30 | 5<br>60/40 |
| (KW) | | | | | | |
| Pump power for cold &<br>warm water (PIB)<br>(KW) | 1020 | 1100 | 1200 | 1330 | 1400 | 1430 |
| Net power output (PWT)<br>(KW) | 1880 | 2100 | 2360 | 2620 | 2800 | 2820 |
| Condensing temperature 12° C. | | | | | | |
| Adiabatic enthalpy drop (AE)<br>(Kcal/kg) | 1.68 | 1.69 | 1.71 | 1.72 | 1.75 | 1.77 |
| Flow rate of working fluid (GF)<br>(ton/hr) | 1550 | 1690 | 1830 | 2010 | 2060 | 2020 |
| Gross power output (POW)<br>(KW) | 2850 | 3120 | 3440 | 3800 | 4000 | 3940 |
| Pump power for<br>working fluid (PIA)<br>(KW) | 150 | 160 | 160 | 170 | 160 | 160 |
| Pump power for cold &<br>warm water (PIB)<br>(KW) | 1020 | 1100 | 1200 | 1320 | 1400 | 1430 |
| Net power output (PT)<br>(KW) | 1680 | 1860 | 2080 | 2310 | 2440 | 2350 |

The results, as shown in Table 1, reveal that the working fluids comprising Flon-22 and Flon-152 permit to produce an electric power output from warm sea water which is significantly higher than that obtainable with use of working fluid comprising Flon-22 alone, and that the electric power output is increased with increasing content of Flon-152 relative to Flon-22 to reach a maximum at the content of Flon-152 of about 30% by weight.

Thus, the working fluid of the invention comprising a mixture of Flon-22 and Flon-152 affords effective utilization of energy of the heat source and reduction of driving power of the pump for working fluid due to its lower vapor pressure than that of Flon-22. Consequently, the working fluids according to the invention is significantly superior to the heretofore known working fluid comprising Flon-22 alone particularly for the Rankine cycle wherein the temperature-difference between higher- and lower-temperature heat sources is so small as in the case of oceanic electric power generation.

EXAMPLES 6–10 AND COMPARISON EXAMPLE 2

Figure 1:
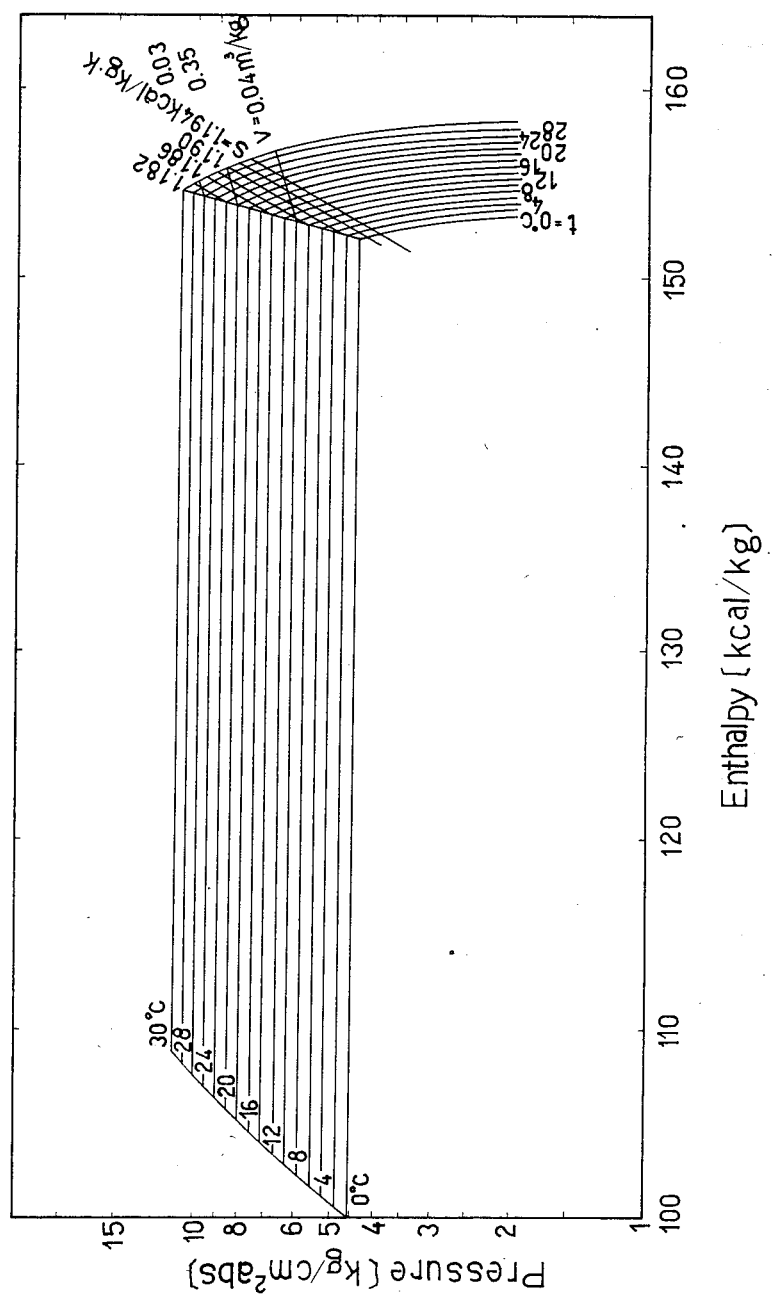
Figure 2:
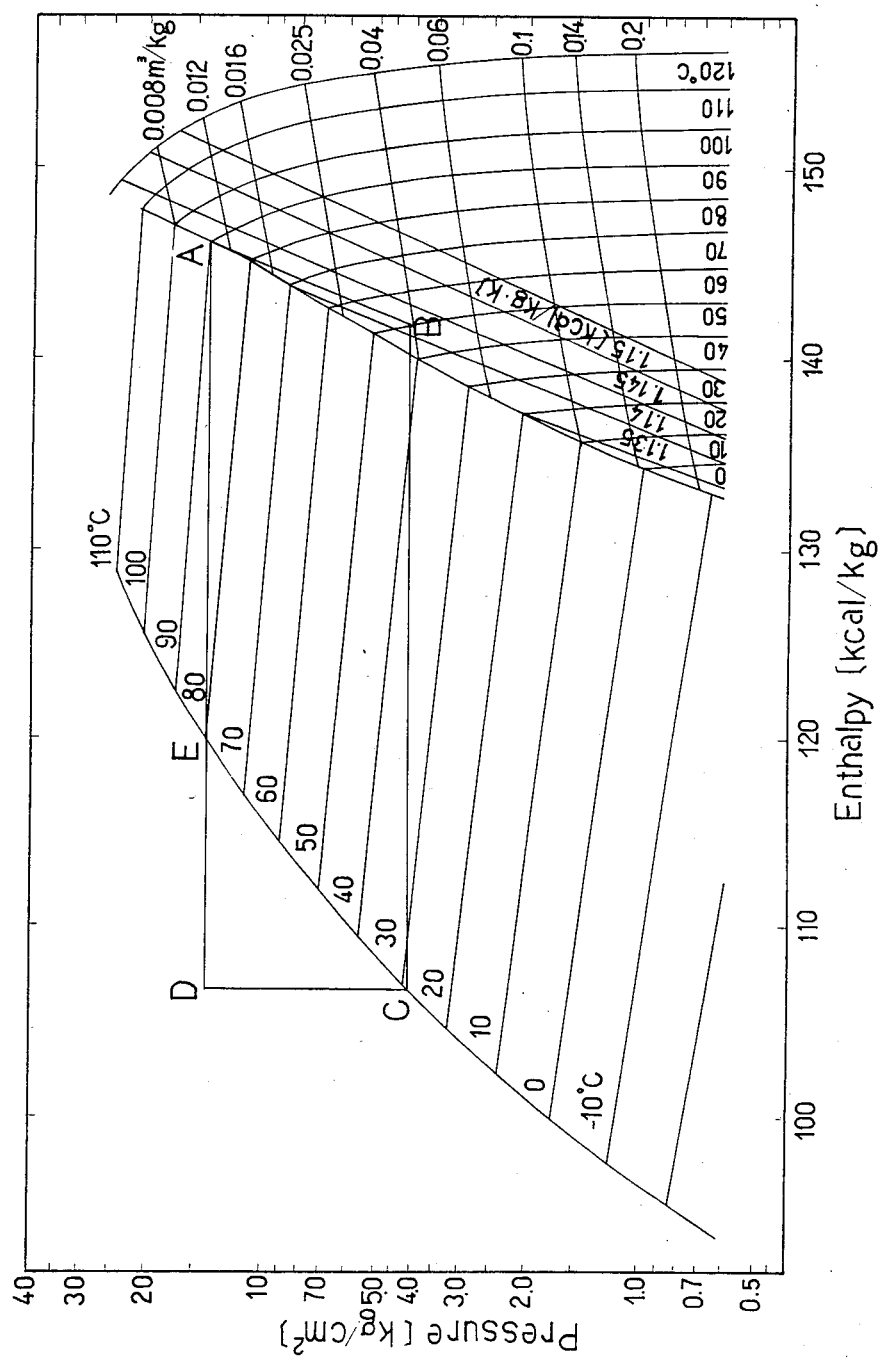

The Rankine cycle illustrated in FIGS. 2 to 4 was carried out with use of the respective working fluids having compositions given in Table 2 below under the following conditions:

Temperature of hot water at point a in FIG. 4—100° C., 120° C. and 140° C.

Temperature of cooling water at point d in FIG. 4—25° C.

The output characteristics were determined in the electric power generation obtained from conversion of thermal energy to mechanical energy at a charging rate of 1500 t/h of hot water. The results are given in Table 2. The evaporation temperature was selected so as to produce a maximum output and the condensing temperature was 28° C.

TABLE 2

| Medium<br>Flon-114/Flon-22 | Comp.<br>Example<br>2<br>100/0 | Example | | | | |
|---|---|---|---|---|---|---|
| | | 6<br>97/3 | 7<br>90/10 | 8<br>80/20 | 9<br>70/30 | 10<br>60/40 |
| Temperature of heat source - 100° C. | | | | | | |
| Adiabatic enthalpy drop (AE)<br>(Kcal/kg) | 3.2 | 3.5 | 3.7 | 4.0 | 4.2 | 4.0 |
| Flow rate of working fluid (GF)<br>(ton/hr) | 1170 | 1090 | 1070 | 1030 | 1010 | 1000 |
| Gross power output (POW)<br>(KW) | 4390 | 4490 | 4590 | 4780 | 4940 | 4650 |
| Pump power for<br>working fluid (PIA)<br>(KW) | 100 | 110 | 140 | 190 | 210 | 250 |
| Pump power for cold &<br>warm water (PIB))<br>(KW) | 420 | 440 | 440 | 430 | 430 | 430 |
| Net power output (PWT)<br>(KW) | 3870 | 3940 | 4010 | 4160 | 4300 | 3970 |
| Temperature of heat source - 120° C. | | | | | | |
| Adiabatic enthalpy drop (AE)<br>(Kcal/kg) | 3.9 | 4.3 | 4.5 | 4.8 | 5.0 | 4.8 |
| Flow rate of working fluid (GF)<br>(ton/hr) | 1870 | 1740 | 1720 | 1680 | 1650 | 1620 |
| Gross power output (POW)<br>(KW) | 8550 | 8750 | 9060 | 9350 | 9600 | 9040 |
| Pump power for | 230 | 250 | 310 | 390 | 470 | 550 |

TABLE 2-continued

| Medium<br>Flon-114/Flon-22 | Comp.<br>Example<br>2<br>100/0 | Example | | | | |
|---|---|---|---|---|---|---|
| | | 6<br>97/3 | 7<br>90/10 | 8<br>80/20 | 9<br>70/30 | 10<br>60/40 |
| working fluid (PIA) (KW) | | | | | | |
| Pump power for cold & warm water (PIB) (KW) | 690 | 700 | 710 | 710 | 700 | 700 |
| Net power output (PWT) (KW) | 7630 | 7800 | 8050 | 8250 | 8420 | 7800 |
| Temperature of heat source - 140° C. | | | | | | |
| Adiabatic enthalpy drop (AE) (Kcal/kg) | 4.7 | 5.2 | 5.4 | 5.5 | 5.8 | 5.6 |
| Flow rate of working fluid (GF) (ton/hr) | 2680 | 2500 | 2480 | 2470 | 2420 | 2370 |
| Gross power output (POW) (KW) | 14710 | 15000 | 15510 | 15950 | 16210 | 15430 |
| Pump power for working fluid (PIA) (KW) | 450 | 490 | 590 | 750 | 900 | 1040 |
| Pump power for cold & warm water (PIB)) (KW) | 1000 | 1010 | 1020 | 1030 | 1030 | 1030 |
| Net power output (PWT) (KW) | 13270 | 13500 | 13900 | 14170 | 14280 | 13360 |

The results, as shown in Table 2, reveal that the working fluids comprising Flon-114 and Flon-22 permit to produce a significant improvement of the electric power output characteristics as compared with working fluid comprising Flon-114 alone and that the electric power output is increased with increasing content of Flon-22 in the range of about 10 to about 30 weight %. Further, with use of the mixture of Flon-114 and Flon-22, outstanding improvement in the cycle efficiency was observed, which is led from the reduced superheat degree of vapor at the outlet of turbine.

In a glass tube were sealed a working fluid comprising Flon-114, Flon-22 or a mixture of Flon-114/Flon-B 22 (weight ratio 70/30) together with iron piece and lubricating oil. The sealed tube was heated at 150° C. for 100 hours and then the resulting working fluids were determined for concentration of halogen and amount of decomposition material by gas chromatography. The results are given in Table 3 below.

TABLE 3

| Working fluid | Conc. of halogen after heating (ppm) | Amount of decomposition material (%) | Remark |
|---|---|---|---|
| Flon-114 + Flon-22 | 34 | 0.1 | This invention |
| Flon-114 | 44 | 0.2 | Control |
| Flon-22 | 180 | 0.7 | Control |

The results shown in Table 3 reveal that the working fluid of the invention comprising a mixture of Flon-114 and Flon-22 forms a reduced amount of halogen ion and reduced amount of decomposition material determined by gas chromatography in contrast with the control working fluids each comprising Flon-114 or Flon-22 alone. With the mixed working fluid of Flon-114 and Flon-22, it is derived that the reduced concentration of halogen formed at a high temperature is due to reduced corrosivity of the working fluid against metal materials of the apparatus and the reduced amount of decomposed material results in inhibition of change of thermodynamic properties as a working fluid for the Rankine cycle due to increase of the decomposition material and of reduction of the cycle efficiency.

Consequently, the working fluids of the invention comprising a mixture of Flon-114 and Flon-22 is markedly superior to the heretofore known working fluids, such as Flon-11 or Flon-114 in the energy-conversion efficiency, heat exchanging characteristics, thermal stability, and the like.

We claim:

1. A method for converting thermal energy into mechanical energy which comprises a cycle consisting of
   (1) vaporizing, with heating, a mixture selected from the group of
      (a) 60 to 95% by weight of chlorodifluoromethane and 5 to 40% by weight of difluoroethane; and
      (b) 3 to 40% by weight of chlorodifluoromethane and 60 to 97% by weight of dichlorotetrafluoroethane;
   (2) expanding the vapor in an expansion device to produce mechanical energy; and
   (3) compressing the vapor by a pump and cooling the vapor to condense the vapor.

2. A method according to claim 1 wherein said mixture comprises 60 to 80% by weight of chlorodifluoromethane and 40 to 20% by weight of difluoroethane.

3. A method according to claim 1 wherein said mixture comprises 10 to 30% by weight of chlorodifluoromethane and 90 to 70% by weight of dichlorotetrafluoroethane.

* * * * *